ns Patent [19]# United States Patent [19]

Hayashi et al.

[11] 4,104,075
[45] Aug. 1, 1978

[54] REFRACTORIES, BATCH FOR MAKING THE SAME AND METHOD FOR MAKING THE SAME

[75] Inventors: Takeshi Hayashi, Bizen; Masao Shibuno, Okayama; Chokei Sawaki, Bizen; Susumu Okazaki, Okucho, all of Japan

[73] Assignee: Shinagawa Refractories Co., Ltd., Tokyo, Japan

[21] Appl. No.: 759,242

[22] Filed: Jan. 13, 1977

[30] Foreign Application Priority Data

Jan. 26, 1976 [JP] Japan .................... 51-6702

[51] Int. Cl.$^2$ .................. C04B 35/52; C04B 35/56
[52] U.S. Cl. .................................. 106/44; 106/56
[58] Field of Search ........................ 106/44, 56

[56] References Cited

U.S. PATENT DOCUMENTS

| | | | |
|---|---|---|---|
| 2,104,841 | 1/1938 | White | 106/44 |
| 3,342,615 | 9/1967 | Miller | 106/44 |
| 3,573,231 | 3/1971 | Subramanya et al. | 106/44 |
| 3,753,744 | 8/1973 | Komaru et al. | 106/44 |
| 3,759,725 | 9/1973 | Steen | 106/44 |
| 3,859,399 | 1/1975 | Bailey et al. | 106/44 |

*Primary Examiner*—J. Poer
*Attorney, Agent, or Firm*—Birch, Stewart, Kolasch and Birch

[57] ABSTRACT

A refractory comprising 30 to 70% by weight of coarse refractory grain, and as an indispensable ingredient, of bonded structure for the coarse refractory grain titanium nitride, silicon carbide and alumina which are formed therein.

28 Claims, No Drawings

REFRACTORIES, BATCH FOR MAKING THE SAME AND METHOD FOR MAKING THE SAME

SUMMARY OF THE INVENTION

The present invention relates to refractories, a batch for making the same and method for making the same. More particularly the present invention is directed to refractories which comprise titanium nitride with or without titanium carbide, silicon carbide and alumina as the indispensable ingredient of a bonded structure for coarse grains of refractories, a batch for making the same and method for making the same.

It has so far been known that titanium nitride is used as a material for ornamental purposes because it has a superior thermal and corrosion resistance properties, and high hardness and abrasion resistance. This material, which is used for ornamental purposes is produced by a powder sintering method. However, a refractory which is caused to form titanium nitride therein so as to give the above properties thereto, and a batch for making the same and method for making the same have not yet been known. It can be said that when titanium nitride and also titanium carbide are caused to form in a refractory a similar result can be obtained. Since silicon carbide also possesses superior thermal and corrosion resistance and has also high hardness and abrasion resistance similar to those of titanium nitride, it has so far been widely used as a refractory material and abrasive material. However, silicon carbide tends to be oxidized, and thus it is generally difficult to form silicon carbide therein when firing is conducted under an oxidative atmosphere or when used under an oxidative atmosphere. Because of this fact, the formed silicon carbide is not maintained in the bonded structure of the refractory and thus the characteristics of silicon carbide are not given thereto. A refractory which is specially provided with an oxidation resistive silicon carbide by added alumina thereto has not yet been suggested.

An object of the present invention is to provide refractories which comprise titanium nitride without or with titanium carbide, silicon carbide and alumina as the indispensable ingredient of a bonded structure for coarse grains of the refractories.

The another object of the present invention is to provide a batch for making the above refractories.

The further object of the present invention is to provide a method for making the above refractories without the above-mentioned difficulties.

As a result of various investigations for attaining the above objects, we have completed the present invention.

The present invention is refractories characterized by comprising coarse refractory grain, and as an indispensable ingredient of bonded structure for the coarse refractory grain titanium nitride, silicon carbide and alumina which are formed therein.

The refractories of the present invention can comprise further titanium carbide which is formed therein as the indispensable ingredient of bonded structure for the coarse refractory grain.

The refractories of the present invention have the following characteristics:

The first characteristic consists in the fact that titanium nitride which has a high price is not used to introduce titanium nitride into the refractory, but rather titanium nitride is introduced into the refractory by forming it from natural titanium oxide containing materials which are readily available. Namely, the refractory of the present invention contains titanium nitride which is formed by adding carbonaceous substance powder (for example graphite powder) and aluminium metal powder to titanium oxide containing material such as rutile flour, ilmenite and the like and by heating the obtained mixture at a temperature of more than 1,300° C in an oxidation atmosphere to achieve deoxidation and nitrogenation and to produce titanium nitride. The refractory containing titanium nitride has superior corrosion resistance particularly to molten pig iron or molten steel. Generally, it is well known that the viscosity of molten pig iron is considerably increased in the presence of minor quantity of titanium nitride. It is recognized from experimental result that the above corrosion resistance of the refractory to the molten metal is remarkably based upon the above special property. Furthermore, an oxidation resistive film is formed on the refractory with the coexistence of minor amounts of titanium and silicon carbide which is explained hereinafter and as a result the oxidation of silicon carbide is considerably inhibited and also the progress of the oxidation of titanium nitride itself is inhibited.

The second characteristic consists in the fact that the refractory of the present invention contains silicon carbide which is formed by the deoxidation and carbonization of silica containing material during the firing or using of the material under a general oxidative atmosphere. Until now, the above reaction is difficult to carry out in the above atmosphere and consequently has been carried out only under a non-oxidizing or reducing atmosphere.

According to the present invention, the silicon carbide can easily be formed in the refractory even if the heating is carried out in an oxidative atmosphere. In the production of the refractory, namely, silicon dioxide containing refractory material is mixed with aluminium metal powder, carbonaceous substance powder (for example graphite powder) and silicon metal powder and then the obtained mixture is heated for example at a temperature of about 1,300° C in the atmosphere to easily deoxidize and carbonize the silica contained in the silicon dioxide containing material and consequently silicon carbide is easily formed in the refractory.

In comparison with a refractory which is generally obtained from the prior silicon carbide material, the refractory of the present invention has a characteristic property that because it contains silicon carbide which is secondly formed from the silicon dioxide containing refractory materials such as fire clay, pyrophyllite, mullite and silica ore, the so-called "self bonding strength" is developed and consequently the high temperature strength is high, particularly, the high temperature strength under an oxidizing atmosphere is very high depending upon the coexistence of titanium nitride. Further, the refractory of the present invention has a low gas permeable structure which is not found in the prior fired refractory and the resistance of the refractory of the present invention to a corrosive vapor or gas is distinguishedly superior to prior refractory. And the refractories of the present invention has the advantage that the thermal conductivity is remarkably good in comparison with prior refractories which are generally obtained from prior silicon carbide material.

The third characteristic consists in the effect which results from the fact that the refractory of the present invention contains fine crystalline alumina formed by the oxidation of aluminum metal powder. This alumina is contained in the refractory giving no adverse effect on the bonding strength of the above silicon carbide.

The refractory of the present invention has the property that even if the silicon carbide in the bonded structure is oxidized under various oxidizing condition to form silicon dioxide, the formed silicon dioxide readily reacts with the above fine crystalline alumina to form the mullite. On the other hand, a minor quantity of amorphous substance derived from impurities which exists in a very minor quantity is formed, and as a result a gas impermeable structure is formed which inhibits the oxidation of silicon carbide.

The prior art refractory having silicon carbide bonding generates a volume change with the formation of crystalline silicon dioxide in most cases when it is oxidized and consequently a deterioration of the bonding strength is unavoidable. Although non-crystalline silicon dioxide is formed depending upon the condition of the oxidizing atmosphere, on the other hand, such amorphous silicon dioxide is liable to give a molten liquid and a lowering of the bonding strength of the refractory is unavoidable. As such oxidation proceeds with the occurrence of a diffusion of oxidizing gas through the silicon dioxide containing film, the oxidizing speed can be gradually decreased but the oxidation can not be completely inhibited and there is still the disadvantage that the bonding strength is deteriorated. In the refractory of the present invention, the mullite is formed under the oxidizing conditions so that the deterioration of the bonding strength does not occurred and on the contrary, the bonding strength is increased. Furthermore, in the refractory of the present invention, there is the advantage that a volume change does not occur even if it is heated for a long time.

The batch for making the refractory of the present invention which comprises coarse refractory grain, and as an indispensable ingredient a bonded structure for the coarse refractory grain comprising titanium nitride, silicon carbide and alumina which are formed therein includes powders of titanium dioxide containing refractory material, carbonaceous substance, silicon metal, aluminium metal and silicon dioxide containing refractory material.

The batch for making the refractory of the present invention which comprises coarse refractory grain, and as an indispensable ingredient a bonded structure for the coarse refractory grain comprising titanium nitride, titanium carbide, silicon carbide and alumina which are formed therein includes powders of titanium dioxide containing refractory material, carbonaceous substance, silicon metal, silicon carbide, aluminium metal and silicon dioxide containing refractory material.

As the example of the titanium dioxide containing refractory material, rutile flour and ilmenite can be used as described before, especially the titanium dioxide containing refractory material containing more than about 30% by weight of titanium dioxide. The particle size of the material is preferably less than 297 $\mu$ and more suitably less than 149 $\mu$. The quantity of the material used is 0.5 to 10% by weight, particularly 1 to 6% by weight is suitable.

As the carbonaceous substance, graphite, electrode scrap, carbon black and coke can be used, particularly a crystalline graphite is most preferable. The particle size of the carbonaceous substance is preferable less than 297 $\mu$ and more suitably less than 149 $\mu$. The quantity of the substance used is 0.5 to 15% by weight, particularly 1 to 10% by weight is suitable.

The particle size of silicon metal powder is preferably less than 297 $\mu$, especially the particle size of less than 149 $\mu$ is most suitable. The quantity of the silicon metal powder is preferably 0.5 to 10% by weight, the range of 1 to 5% by weight is most suitable.

The particle size of silicon carbide when used is preferably less than 297 $\mu$, especially the particle size of less than 177 $\mu$ is most suitable. The quantity of the silicon carbide is 1 to 25% by weight, especially 5 to 20% by weight is suitable.

The quantity of aluminium metal is in the range of 1 to 30% by weight, the range of 3 to 15% by weight is suitable. The particle size of aluminium metal powder is less than 297 $\mu$, especially the particle size of less than 149 $\mu$ is suitable.

As the example of silicon dioxide containing refractory material, there are mentioned pyrophyllite, fire clay, mullite, silica ore and zircon. The particle size of these materials is less than 297 $\mu$, especially the particle size of less than 149 $\mu$ is suitable. The quantity of the above material is 5 to 20% by weight, the material containing 3 to 15% by weight of silicon dioxide is most preferable.

In the above batch, the alumina itself, for example a calcined alumina can be added in addition to the above components.

The method for making the refractory of the present invention which comprises coarse refractory grain, and as an indispensable ingredient a bonded structure for the coarse refractory grain comprising titanium nitride, silicon carbide and alumina which are formed therein is one wherein a batch comprising titanium dioxide containing refractory material, carbonaceous substance, silicon metal, aluminium metal and silicon dioxide containing refractory material powders are mixed to a coarse grain and the obtained mixture is heated.

The method for making the refractory of the present invention which comprises coarse refractory grain, and as an indispensable ingredient a bonded structure for the coarse refractory grain comprising titanium nitride, titanium carbide, silicon carbide and alumina which are formed therein is one wherein a batch comprising titanium dioxide containing refractory material, carbonaceous substance, silicon metal, silicon carbide, aluminium metal and silicon dioxide containing refractory material powders are mixed to a coarse grain and the obtained mixture is heated.

The titanium dioxide containing refractory material, carbonaceous substance, silicon metal, silicon carbide, aluminium metal and silicon dioxide containing refractory material which can be used in these methods are those disclosed hereinabove.

As the example of the aggregate, there are mentioned a coarse grain of the refractory materials of silicon carbide type, high alumina type, mullite type, fire clay type, silica ore type, magnesia type, magnesia-dolomite type and zircon type. One or more of the above coarse grains can be used after their particle grading.

In the method for making the refractory of the present invention, the preferable temperature which is sufficient to form the above indispensable ingredient of the refractory is 1,300° to 1,600° C, particularly 1,400° to 1,500° C.

The method for making the refractory of the present invention is discussed in detail hereinbelow.

As the ingredient which makes the bonding structure of the refractory, there is first mentioned, 0.5 to 10% by weight based upon the whole weight of the refractory of a fine powder of the refractory material containing 30% by weight of $TiO_2$ for example a natural material such as rutile flour or ilmenite is prepared and a powder of graphite such as crystalline graphite and electrode scrap is added thereto in an amount of 0.5 to 3.0 times as much as the amount of $TiO_2$ by weight (Mixture I). On the other hand, an aluminium metal powder is added to a powder of refractory material containing $SiO_2$ such as pyrophyllite, fire clay, mullite and silica ore in an amount of 1.0 to 1.5 times as much as the amount of $SiO_2$. 10.0 to 30.0% by weight, based upon the whole weight of the refractory of the obtained mixture, is mixed with 1.0 to 10.0% by weight based on the whole weight of the refractory of silicon metal powder and if necessary with 5.0 to 20.0% by weight of fine silicon carbide powder (Mixture II).

Mixture I and Mixture II which form the bonding structure portion of the refractory amount to 30 to 70% by weight, based upon the whole weight of the refractory. The rest forms the coarse grain portion of the refractory.

Mixture I and Mixture II are mixed with the coarse grain if necessary together with an inorganic binder such as clay or an organic binder such as pulp spent liquor and resin.

Finally, the obtained mixture is heated at a temperature of 1,300° to 1,600° C.

The heating of the above final mixture may be carried out by forming said mixture, drying the formed mixture and then firing it when a fired refractory is produced. When it is used as an unfired refractory, the above heating may be carried out in the course of use.

In the batch and method of the refractory of the present invention, the reasons why the weight ratio of each of various materials and substances is restricted are due to the facts that the aimed effect is not displayed if the quantity is less than the lower limit, or the aimed effect is achieved in only at very low degree. The addition of various materials and substances is harmful in a quantity of more than the upper limit.

As described above, the important characteristic point of the present invention is that a graphite powder, and also aluminium metal powder and fine silicon metal powder which have a very high deoxidation ability are present in the bonding structure portion and have the effect of forming an oxidation inhibiting film cmprising $TiO_2$ and as a result even if the firing is carried out under oxidizing conditions the inner part of the refractory is maintained under a strong reducing atmosphere and consequently a refractory having high resistivity to alkali vapor attack, high resistivity to alkali liquid attack, high oxidation resistance and scarce deterioration of strength, low permeability and therefore high resistivity to gas action, and high thermal conductivity can be obtained.

The present invention is illustrated in more detail by the following examples.

EXAMPLE 1

Table 1 shows the composition having the proportion, by weight, of the raw materials used in the present invention.

Table 1

| Raw materials | | Proportion of raw materials (% by weight) | | | |
|---|---|---|---|---|---|
| | | Product A | B | C | D |
| Bonding matrix portion (less than 0.3 mm) | Rutile flour | 1 | 2 | 5 | 10 |
| | Graphite | 1 | 1 | 6 | 10 |
| | Clay | 12 | 10 | — | 10 |
| | Mullite clinker | — | — | 10 | — |
| | Sintered alumina | 5 | 5 | 5 | — |
| | Aluminum | 8 | 10 | 3 | 5 |
| | Silicon | 2 | 2 | 4 | 6 |
| | Silicon carbide | 20 | 20 | 10 | 5 |
| | Magnesia clinker | — | — | — | 5 |
| Coarse grain portion (5 to 0.3mm) | Silicon carbide | 51 | 50 | — | — |
| | Sintered alumina | — | — | 55 | — |
| | Magnesia clinker | — | — | — | 49 |

These compositions were formed under a forming pressure of 100 kg/cm². The apparent porosity, bulk density and cold crushing strength of the products which were obtained by firing the above formed bodies at the temperature of 1,500° C for 5 hours were measured and the results are as shown in Table 2.

Table 2

| Properties | Density and crushing strength after heating at 1,500° C | | | |
|---|---|---|---|---|
| | Product A | B | C | D |
| Apparent porosity (%) | 24.3 | 22.4 | 25.6 | 24.5 |
| Bulk density | 2.49 | 2.53 | 2.52 | 2.60 |
| Cold crushing strength (kg/cm²) | 530 | 610 | 490 | 420 |

The quantities of titanium nitride, silicon carbide and alumina in the products which were formed by firing the above formed bodies at a temperature of 1,200° to 1,700° C for 5 hours were measured. As the results, the respective effect of the temperature on the formed quantities of titanium nitride, silicon carbide and alumina in the bonded structures of the products are shown in the form of X-ray diffraction intensity ratio in Table 3, 4 and 5.

Table 3

| Temperature (° C) | Effect of firing temperature on the amount of TiN formation in matrix (Intensity ratio of X-ray diffraction) | | | |
|---|---|---|---|---|
| | Product A | B | C | D |
| 1,200 | 1 | 2 | 3 | 6 |
| 1,300 | 4 | 9 | 10 | 28 |
| 1,400 | 13 | 26 | 32 | 91 |
| 1,500 | 16 | 28 | 34 | 98 |
| 1,600 | 17 | 29 | 36 | 100 |
| 1,700 | 17 | 29 | 36 | 100 |

Table 4

| Temperature (° C) | Effect of firing temperature of the amount of SiC formation in matrix (Intensity ratio of X-ray diffraction) | | | |
|---|---|---|---|---|
| | Product A | B | C | D |
| 1,200 | 51 | 45 | 48 | 59 |
| 1,300 | 75 | 68 | 69 | 89 |
| 1,400 | 81 | 76 | 79 | 97 |
| 1,500 | 83 | 80 | 81 | 99 |
| 1,600 | 84 | 82 | 83 | 100 |
| 1,700 | 84 | 82 | 83 | 100 |

Table 5
Effect of firing temperature on the amount of Al₂O₃ formation in matrix
(Intensity ratio of X-ray diffraction)

| Temperature (° C) | A | B | C | D |
|---|---|---|---|---|
| 1,200 | 78 | 84 | 38 | 18 |
| 1,300 | 90 | 97 | 54 | 20 |
| 1,400 | 93 | 98 | 58 | 20 |
| 1,500 | 95 | 99 | 62 | 23 |
| 1,600 | 97 | 100 | 62 | 25 |
| 1,700 | 96 | 100 | 63 | 25 |

EXAMPLE 2

Table 6 shows the composition having the proportion, by weight, of the raw materials used in the present invention. These composition were formed under a forming pressure of 700 kg/cm² and the properties of the products which were obtained by firing the above formed bodies at the temperature of 1,400° C in an atmosphere of air were measured. The results are as shown in Table 7.

Table 6

| | Raw material | E | F*¹ | G | H | I | J*² | K | L | M | N | O |
|---|---|---|---|---|---|---|---|---|---|---|---|---|
| | Rutile flour | 1 | 5 | 2 | 4 | 2 | 10 | 2 | 2 | 5 | 0.5 | 2 |
| | Graphite | 1 | 3 | 1 | 2 | 2 | 5 | 6 | 1 | 5 | 1.5 | 1 |
| | Pyrophyllite ore | — | — | 10 | — | — | — | — | — | — | 10 | — |
| | Clay | 12 | — | — | 12 | 10 | 10 | 12 | 15 | 20 | — | — |
| Bonding matrix portion (less than 0.3 mm) | Mullite clinker | — | 15 | — | — | — | — | — | — | — | — | 20 |
| | Sintered alumina | 5 | 5 | 5 | 5 | 5 | 5 | 8 | — | — | 10 | 10 |
| | Aluminum | 8 | 8 | 8 | 8 | 8 | 5 | 8 | 10 | 10 | 5 | 3 |
| | Silicon | 2 | 2 | 2 | 4 | 2 | 5 | 10 | 3 | 10 | 2 | 2 |
| | Silicon carbide | 20 | 15 | 10 | 10 | 15 | 11 | — | 20 | — | 15 | 10 |
| | Magnesia clinker | — | — | — | — | 5 | — | — | — | — | — | — |
| | Silicon carbide | 51 | 47 | 30 | — | — | — | — | — | — | — | — |
| | Sintered alumina | — | — | 17 | 45 | — | — | — | — | — | — | — |
| Coarse grain portion (5 to 0.3 mm) | Mullite clinker | — | — | — | — | — | 49 | — | — | — | — | — |
| | Chamotte | — | — | — | — | — | — | 54 | — | — | — | — |
| | Pyrophyllite ore | — | — | — | — | — | — | — | 49 | — | — | — |
| | Quartzite | — | — | — | — | — | — | — | — | 50 | — | — |
| | Magnesia clinker | — | — | — | — | 49 | — | — | — | — | — | — |
| | Synthetic Magnesia-dolomite clinker | — | — | — | — | — | — | — | — | — | 56 | — |
| | Zircon sand | — | — | — | — | — | — | — | — | — | — | 52 |

*¹The forming was carried out under the pressure of 1,200 kg/cm².
*²The forming was carried out under the pressure of 1,000 kg/cm².

Table 7

Physical properties of inverted products

| Property | | E | F | G | H | I | J | K | L | M | N | O |
|---|---|---|---|---|---|---|---|---|---|---|---|---|
| Apparent porosity(%) | | 18.0 | 17.6 | 18.3 | 18.7 | 22.3 | 20.4 | 22.5 | 19.7 | 18.9 | 17.4 | 20.6 |
| Bulk density | | 2.69 | 2.68 | 2.77 | 2.98 | 2.63 | 2.76 | 2.40 | 2.43 | 2.70 | 2.82 | 4.11 |
| Corrosion resistance by molten iron*¹ | | 0 | 0 | 4 | 10 | 2 | 0 | 7 | 10 | 15 | 4 | 3 |
| Alkali resistance*² | | 0 | 0 | 0 | 0 | 0 | 10 | 5 | 2 | 2 | 1 | 5 |
| Oxidation resistance*³ | | 0 | 0 | 0 | 0 | 20 | 0 | 0 | 0 | 0 | 10 | 0 |
| Bending strength(kg/cm²) at room temperature | | 250 | 240 | 240 | 250 | 150 | 200 | 260 | 260 | 180 | 120 | 200 |
| Mineral phase of bonding part (X-ray diffraction intensity ratio) | TiN | 5 | 10 | 9 | 15 | 8 | 17 | 8 | 7 | 21 | 3 | 9 |
| | Al₂O₃ | 78 | 100 | 67 | 78 | 30 | 54 | 80 | 99 | 100 | 24 | 75 |
| | SiC | 26 | 21 | 25 | 37 | 24 | 41 | 56 | 35 | 61 | 23 | 27 |
| | TiC | — | 7 | — | — | — | 15 | — | — | — | — | — |

*¹The test piece having the size of 65×55×200 mm is applied in a cylindrical plain type rotatable corrosion test apparatus and was heated to corrode at the temperature of 1,600° C for three hours using 6 kg of pig iron as a corroding agent. The result is expressed in the corrosion percentage (volume %) after the above heating.
*²The test piece having the size of 15×15×170 mm is hung on the mixture of potassium carbonate and carbon which is charged into a crucible and then the under portion of the crucible is heated at the temperature of 1,400° C to generate alkali vapour and is maintained at that temperature for two hours. The deterioration of bending strength at normal temperature after the test is expressed in percentage.
*³The test piece having the size of 15×15×75 mm is heated at the temperature of 1,200° C for 100 hours in a cylindrical furnace made of silicon carbide heating element with the introduction of air in the flow rate of 500 cc/min. The deterioration of the bending strength at normal temperature after the test is expressed in percentage.

What we claim is:

1. A refractory comprising about 30 to 70% by weight of a coarse refractory grain and, as an indispensable ingredient for the coarse refractory grain, a bonded structure comprising about 0.1 to 8.0% by weight titanium nitride, about 0.5 to 30% by weight silicon carbide, and about 1.5 to 55% by weight of alumina, said bonded structure being formed in the refractory.

2. The refractory of claim 1, wherein the coarse refractory grain is a member selected from the group consisting of silicon carbide, high alumina, mullite, fire clay, silica ore, magnesia, magnesia-dolomite, and zircon.

3. A batch for making the refractory of claim 1, which comprises about 30 to 70% by weight of coarse refractory grain, about 0.5 to 10% by weight titanium dioxide containing refractory material powder, about 0.5 to 15% by weight of a carbonaceous substance powder, about 0.5 to 10% by weight of silicon metal powder, about 1 to 30% by weight of aluminum metal powder and about 5 to 20% by weight of silicon dioxide containing refractory metal powder.

4. The batch of claim 3, wherein the coarse refractory grain is a member selected from the group consisting of silicon carbide, high alumina, mullite, fire clay, silica ore, magnesia, magnesia-dolomote and zircon.

5. The batch of claim 3, wherein the titanium containing refractory metal is selected from the group consisting of rutile and ilumenite.

6. The batch of claim 3, wherein the carbonaceous substance is selected from the group consisting of graphite, electrode scrap, carbon black and coke.

7. The batch of claim 3, wherein the silicon dioxide containing refractory material is selected from the group consisting of pyrophyllite, fire clay, mullite and silica ore.

8. A method for the manufacture of a refractory comprising about 30 to 70% by weight of a coarse refractory grain and, as an indispensable ingredient for the coarse refractory grain, a bonded structure comprising about 0.1 to 8.0% by weight titanium nitride, about 0.5 to 30% by weight silicon carbide and about 1.5 to 55% by weight of alumina, said bonded structure being formed in the refractory, which comprises kneading and forming a batch comprising 30 to 70% by weight of coarse refractory grain, about 0.5 to 10% by weight titanium dioxide containing refractory material powder, about 0.5 to 15% by weight of a carbonaceous substance powder, about 0.5 to 10% by weight of silicon metal powder, about 1 to 30% by weight of aluminum metal powder, and about 5 to 20% by weight of silicon dioxide containing refractory metal powder, and heating the batch at a temperature of about 1,300° to 1,600° C.

9. A batch for making the refractory of claim 1, which comprises about 30 to 70% by weight of coarse refractory grain, about 0.5 to 10% by weight of titanium dioxide containing refractory material powder, about 0.5 to 15% by weight of a carbonaceous substance powder, about 0.5 to 10% by weight of silicon metal powder, about 1 to 30% by weight of aluminum metal powder, about 5 to 20% by weight of silicon dioxide containing refractory material powder, and about 1 to 25% by weight of silicon carbide.

10. The batch of claim 9, wherein the coarse refractory grain is a member selected from the group consisting of silicon carbide, high alumina, mullite, fire clay, silica ore, magnesia-dolomite, and zircon.

11. The batch of claim 9, wherein the titanium containing refractory material is a member selected from the group consisting of rutile and ilumenite.

12. The batch of claim 9, wherein the carbonaceous substance is a member selected from the group consisting of graphite, electrode scrap, carbon black, and coke.

13. The batch of claim 9, wherein the silicon dioxide containing refractory material is a member selected from the group consisting of pyrophyllite, fire clay, mullite and silica ore.

14. A method for manufacturing a refractory comprising about 30 to 70% by weight of coarse refractory grain and, as an indispensable ingredient for the coarse refractory grain, a bonded structure comprising about 0.1 to 8.0% by weight titanium nitride, about 0.5 to 30% by weight silicon carbide, and about 1.5 to 55% by weight of alumina, said bonded structure being formed in the refractory, which comprises kneading and forming a batch comprising about 30 to 70% by weight of coarse refractory grain, about 0.5 to 10% by weight of titanium dioxide containing refractory material powder, about 0.5 to 15% by weight of carbonaceous powder, about 0.5 to 10% by weight of silicon metal powder, about 1 to 30% by weight of aluminum metal powder, about 5 to 20% by weight of silicon dioxide containing refractory material powder and about 1 to 25% by weight of silicon carbide, and heating the batch at a temperature of about 1,300° to 1,600° C.

15. A refractory comprising about 30 to 70% by weight of coarse refractory grain and, as an indispensable ingredient for the coarse refractory grain, a bonded structure comprising about 0.1 to 8.0% by weight titanium nitride plus titanium carbide, about 0.5 to 30% by weight of silicon carbide, and about 1.5 to 55% by weight of alumina, said bonded structure being formed in the refractory.

16. The refractory of claim 15, wherein the coarse refractory grain is a member selected from the group consisting of silicon carbide, high alumina, mullite, fire clay, silica ore, magnesia, magnesia-dolomite, and zircon.

17. A batch for making the refractory of claim 15, which comprises about 30 to 70% by weight of coarse refractory grain, about 0.5 to 10% by weight titanium dioxide containing refractory material powder, about 0.5 to 15% by weight of a carbonaceous substance powder, about 0.5 to 10% by weight of silicon metal powder, about 1 to 30% by weight of aluminum metal powder and about 5 to 20% by weight of silicon dioxide containing refractory powder.

18. The batch of claim 17, wherein the coarse refractory grain is a member selected from the group consisting of silicon carbide, high alumina, mullite, fire clay, silica ore, magnesia-dolomite, and zircon.

19. The batch of claim 17, wherein the titanium containing refractory material is a member selected from the group consisting of rutile and ilumenite.

20. The batch of claim 17, wherein the carbonaceous substance is a member selected from the group consisting of graphite, electrode scrap, carbon black, and coke.

21. The batch of claim 17, wherein the silicon dioxide containing refractory material is a member selected from the group consisting of pyrophyllite, fire clay, mullite and silica ore.

22. A method for the manufacture of a refractory comprising about 30 to 70% by weight of a coarse refractory grain and, as an indispensable ingredient for the coarse refractory grain, a bonded structure comprising about 0.1 to 8.0% by weight titanium nitride plus titanium carbide, about 0.5 to 30% by weight silicon carbide and about 1.5 to 55% by weight of alumina, said bonded structure being formed in the refractory, which comprises kneading and forming a batch comprising 30 to 70% by weight of coarse refractory grain, about 0.5 to 10% by weight titanium dioxide containing refractory material powder, about 0.5 to 15% by weight of a carbonaceous substance powder, about 0.5 to 10% by weight of silicon metal powder, about 1 to 30% by weight of aluminum metal powder, and about 5 to 20% by weight of silicon dioxide containing refractory metal powder, and heating the batch at a temperature of about 1,300° to 1,600° C.

23. A batch for making the refractory of claim 15, which comprises about 30 to 70% by weight of coarse refractory grain, about 0.5 to 10% by weight titanium dioxide containing refractory material powder, about 0.5 to 15% by weight of a carbonaceous substance powder, about 0.5 to 10% by weight of silicon metal powder, about 1 to 30% by weight of aluminum metal powder, and about 5 to 20% by weight of silicon dioxide containing refractory powder, and about 1 to 25% by weight of silicon carbide powder.

24. The batch of claim 23, wherein the coarse refractory grain is a member selected from the group consisting of silicon carbide, high alumina, mullite, fire clay, silica ore, magnesia-dolomite, and zircon.

25. The batch of claim 23, wherein the titanium containing refractory material is a member selected from the group consisting of rutile and ilumenite.

26. The batch of claim 23, wherein the carbonaceous substance is a member selected from the group consisting of graphite, electrode scrap, carbon black, and coke.

27. The batch of claim 23, wherein the silicon dioxide containing refractory material is a member selected from the group consisting of pyrophyllite, fire clay, mullite and silica ore.

28. A method for the manufacture of a refractory comprising about 30 to 70% by weight of a coarse refractory grain and, as an indispensable ingredient for the coarse refractory grain, a bonded structure comprising about 0.1 to 8.0% by weight titanium nitride plus titanium carbide, about 0.5 to 30% by weight silicon carbide and about 1.5 to 55% by weight of alumina, said bonded structure being formed in the refractory, which comprises kneading and forming a batch comprising 30 to 70% by weight of coarse refractory grain, about 0.5 to 10% by weight titanium dioxide containing refractory material powder, about 0.5 to 15% by weight of a carbonaceous substance powder, about 0.5 to 10% by weight of silicon metal powder, about 1 to 30% by weight of aluminum metal powder, and about 5 to 20% by weight of silicon dioxide containing refractory metal powder, and about 1 to 25% by weight of silicon carbide powder, and heating the batch at a temperature of about 1,300° to 1,600° C.

* * * * *